United States Patent
Huang et al.

(10) Patent No.: US 9,615,133 B2
(45) Date of Patent: Apr. 4, 2017

(54) CONTROL MODULE OF MULTIMEDIA DEVICE AND METHOD FOR CONTROLLING MULTIMEDIA DEVICE TO GENERATE IMAGE DATA REQUIRED BY DISPLAY MODULE

(71) Applicant: MStar Semiconductor, Inc., Hsinchu Hsien (TW)

(72) Inventors: Ling-Hsuan Huang, Zhubei (TW); Sung-Wen Wang, Zhubei (TW); Yi-Shin Tung, Zhubei (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 14/516,679

(22) Filed: Oct. 17, 2014

(65) Prior Publication Data

US 2015/0109535 A1   Apr. 23, 2015

(30) Foreign Application Priority Data

Oct. 17, 2013   (TW) .............................. 102137549 A

(51) Int. Cl.
*H04N 5/44* (2011.01)
*H04N 21/443* (2011.01)
(Continued)

(52) U.S. Cl.
CPC ....... *H04N 21/4432* (2013.01); *G06F 9/4403* (2013.01); *H04N 5/4403* (2013.01);
(Continued)

(58) Field of Classification Search
CPC .... H04N 21/4432; H04N 5/63; H04N 5/4403; H04N 21/42222; H04N 21/4222;
(Continued)

(56) References Cited

U.S. PATENT DOCUMENTS 8,392,944 B2 * 3/2013 Jung .................... G06F 9/4403
                                                        713/1
8,909,909 B2 * 12/2014 Ziarnik .................. G06F 1/24
                                                        710/10
(Continued)

FOREIGN PATENT DOCUMENTS

| TW | I247548 B    | 1/2006 |
| TW | 201305854 A  | 2/2013 |
| TW | 201338510 A  | 9/2013 |

OTHER PUBLICATIONS

Taiwan Office Action, May 5, 2015, 8 pages.

*Primary Examiner* — Trang U Tran
(74) *Attorney, Agent, or Firm* — Edell, Shapiro & Finnan, LLC

(57) ABSTRACT

A control module of a multimedia device for generating display data required by a display module is provided. The control module includes: a signal receiving and analyzing unit, configured to receive a first signal to accordingly generate a pre-boot command, and to receive a second signal to accordingly generate a boot command; and a processor, configured to perform a pre-boot process according to the pre-boot signal to generate the image data, to enter a waiting mode when the pre-boot process is complete, and to exit the waiting mode according to the boot command. The image data is not used to display an image by the display module when the processor remains in the waiting mode.

19 Claims, 9 Drawing Sheets

(51) Int. Cl.
 *G06F 9/44* (2006.01)
 *H04N 5/63* (2006.01)
 *H04N 21/422* (2011.01)

(52) U.S. Cl.
 CPC ........... *H04N 5/63* (2013.01); *H04N 21/4222* (2013.01); *H04N 21/42222* (2013.01)

(58) Field of Classification Search
 CPC ... H04N 2005/4425; H04N 2005/4428; H04N 2005/4432; G06F 9/44
 USPC ........................................ 348/730, 734, 725
 See application file for complete search history.

(56) References Cited

U.S. PATENT DOCUMENTS

| | | | | |
|---|---|---|---|---|
| 2003/0200428 A1* | 10/2003 | Chan | .................... | G06F 9/4416 713/1 |
| 2009/0150660 A1* | 6/2009 | Yao | ....................... | G06F 9/4406 713/2 |
| 2010/0007801 A1* | 1/2010 | Cooper | ................. | G06F 1/3203 348/730 |
| 2010/0299310 A1* | 11/2010 | Sun | ........................ | G06F 1/3203 707/640 |

* cited by examiner

CONTROL MODULE OF MULTIMEDIA DEVICE AND METHOD FOR CONTROLLING MULTIMEDIA DEVICE TO GENERATE IMAGE DATA REQUIRED BY DISPLAY MODULE

This application claims the benefit of Taiwan application Serial No. 102137549, filed Oct. 17, 2013, the subject matter of which is incorporated herein by reference.

BACKGROUND OF THE INVENTION

Field of the Invention

The invention relates in general to a control module of a multimedia device and a method for controlling a multimedia device to generate image data required by a display module, and more particularly, to a control module of a multimedia device and a method for controlling a multimedia device to generate image data required by a display module that perform a pre-boot process.

Description of the Related Art

The screen of a television is generally turned on after pressing the power button. That is, the display module is activated and is ready to display images. At this point, the television is still in a boot process, in which processes such as system initialization as well as receiving, down-converting, demodulating and deinterlacing television signals are performed. Thus, although the display module is activated, the screen only displays an image after a certain period of time. As such, a black image is observed for a period from pressing the power button to actually viewing an image, with the period of showing the black image slightly varying in length due to differences in televisions. For a television that carries an operating system, e.g., a smart television, the period required for the boot process is longer, hence a longer period of showing the black image. On account of such drawback, not only unsatisfactory user experiences are caused, but also a considerable amount of power may be consumed by the display module during the boot process.

In a conventional solution, viewing habits of users are analyzed to identify a period in which a television is most viewed, and the television is set to automatically pre-boot in that period. Accordingly, without going through a period of showing a black image, a television image can be immediately viewed upon pressing the power button. However, analysis results cannot 100% accurately predict user behaviors. Further, if the television is left activated (without displaying an image) while user is not watching the television in that period, additional resources are virtually wasted.

SUMMARY OF THE INVENTION

The invention is directed to a control module of a multimedia device and a method for controlling a multimedia device to generate image data required by a display module. The control module and method are capable of performing a pre-boot process before the multimedia device is officially activated, so as to reduce the period of a black image and enhance user experiences.

The present invention discloses a control module of a multimedia device for generating image data required by a display module. The control module includes: a signal receiving and analyzing unit, configured to receive a first signal to accordingly generate a pre-boot command, and to receive a second signal to accordingly generate a boot command; and a processor, configured to perform a pre-boot process according to the pre-boot signal to generate the image data, to enter a waiting mode when the pre-boot process is complete, and to exit the waiting mode according to the boot command. The image data is not used to display an image by the display module when the processor remains in the waiting mode.

The present invention further discloses a method for controlling a multimedia device to generate image data required by a display module. The method includes: receiving a first signal and accordingly generating a pre-boot command; performing a pre-boot process according to the pre-boot command, and controlling the multimedia device to enter a waiting mode when the pre-boot process is complete; receiving a second signal and accordingly generating a boot command when the multimedia device remains in the waiting mode; and controlling the display device to exit the waiting mode according to the boot command. The image data is not used to display an image by the display module when the multimedia device remains in the waiting mode.

The control module of a multimedia device and the method for controlling a multimedia device to generate image data required by a display module of the present invention are capable of performing a pre-boot process according to a pre-boot command. The generating of the pre-boot command is associated with a preparatory operation before activating the multimedia device. Compared to a conventional solution, the pre-boot process of the present invention more accurately reacts to a preparatory user behavior of for activating a multimedia device, thereby more effectively shortening the period of a black image before booting and enhance user experiences, as well as preventing the display module, which has no available display image during the boot process, from consuming unnecessary power.

The above and other aspects of the invention will become better understood with regard to the following detailed description of the preferred but non-limiting embodiments. The following description is made with reference to the accompanying drawings.

DETAILED DESCRIPTION OF THE INVENTION

Technical terms of the application are based on the general definition in the technical field of the application. If the application describes or explains one or some terms, definitions of the terms are based on the description or explanation of the application.

The present invention discloses a control module of a multimedia device and a method for controlling a multimedia device to generate image data required by a display module. The control device and the method perform a pre-boot process to shorten a waiting period between activating the multimedia device to displaying an image. In possible implementation, one skilled person in the art may choose equivalent elements or steps to implement the disclosure based on the disclosure of the application. That is, the implementation of the disclosure is not limited by the embodiments disclosed in the disclosure. Further, a part of the elements included in the control module of a multimedia device of the disclosure are individually known elements. Without affecting the full disclosure and possible implementation of the device, details of the known elements are omitted. Further, the method for controlling a multimedia device to generate image data required by a display module of the disclosure may be implemented by the control module of a multimedia device of the disclosure or an equivalent device. Without affecting the full disclosure and possible implementation of the method of the disclosure, the description of the method focuses on the steps of the method instead of hardware.

Figure 1:
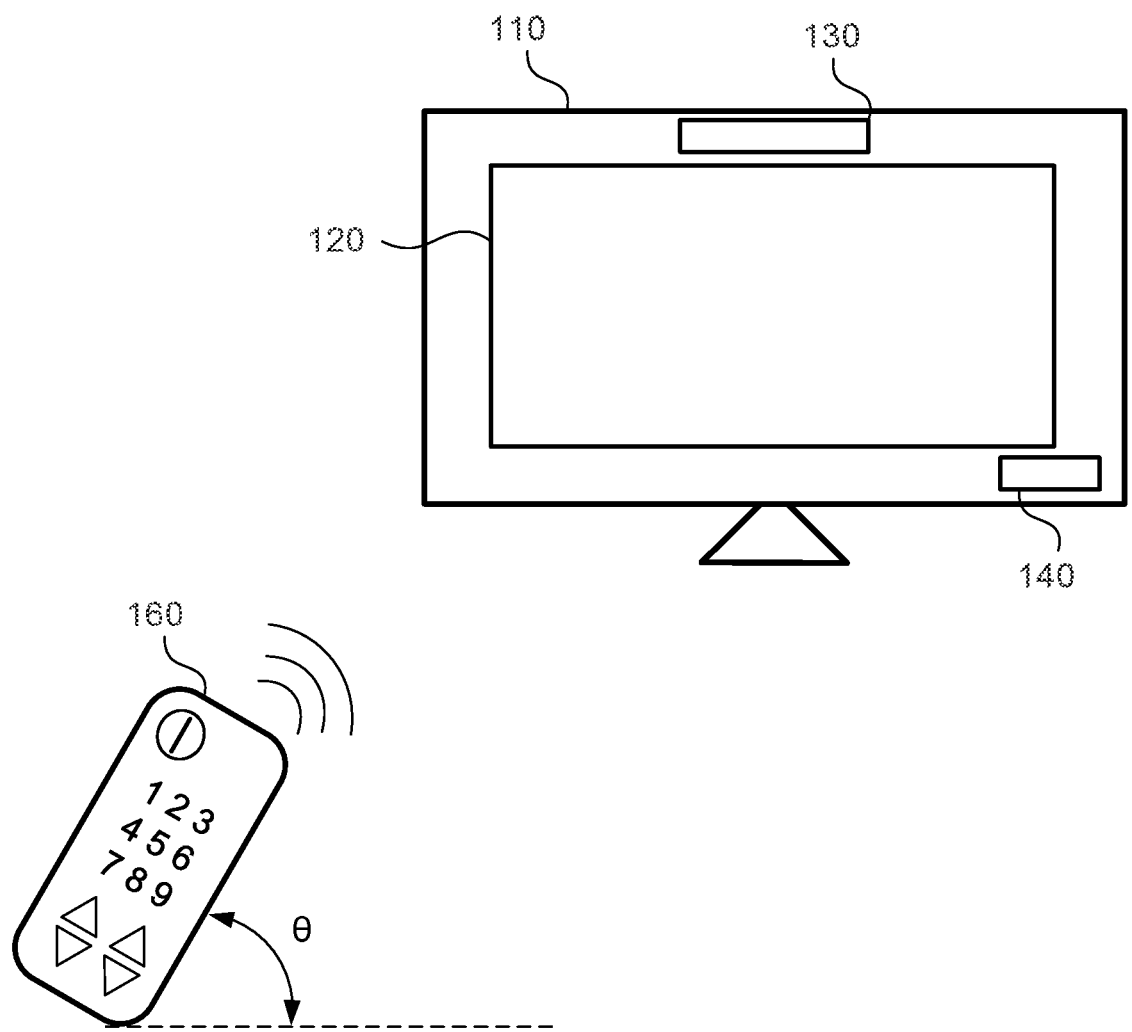
FIG. 1 is a schematic diagram of a multimedia device and a remote controller of the present invention.

FIG. 1 shows a multimedia device (e.g., a television device) and a remote controller of the present invention. A television device 110 includes a signal receiving and analyzing unit 130 and a display module 120. The signal receiving and analyzing unit 130 receives an external signal sent to the television device 110 from a remote controller 160, for example. It should be noted that, in addition to communicating via wireless transmission as shown in FIG. 1, the remote controller 160 may also communicate with the signal receiving and analyzing unit 130 via wired transmission. When communicating via wireless transmission, the remote controller 160 may transmit infrared or Bluetooth signals, and the signal receiving and analyzing unit 130 then correspondingly includes an infrared or Bluetooth receiver. If the wireless transmission is implemented by Wi-Fi such WLAN, the remote controller 160 and the signal receiving and analyzing unit 130 may include wireless network transceiver modules for transmitting and receiving wireless network signals. Further, between the remote controller 160 and the signal receiving and analyzing unit 130, signals may also be transmitted through a relay station, e.g., a wireless network access point (AP). If the communication between the remote controller 160 and the signal receiving and analyzing unit 130 is carried out by a network, the remote controller 160 may transmit signals by utilizing a wireless means and the signal receiving and analyzing unit 130 may receive signals by utilizing a wired means. For example, the remote controller 160 transmits signals via a wireless network; the signals are received by a wireless network AP and then transmitted to the signal receiving and analyzing unit 130 by a wired means such as via the Ethernet. At this point, the signal receiving and analyzing unit 130 includes an Ethernet transceiver module for transmitting and receiving Ethernet signals. If the signal receiving and analyzing unit 130 has a fixed Internet Protocol (IP) address on the Internet, the remote controller 160 may transmit signals to the Internet and then to the signal receiving and analyzing unit 130. For example, the remote controller 160 may transmit signals via a telecommunication network.

Under normal circumstances, to use the television device 110, a power button on the remote controller 160 is pressed to prompt the remote controller 160 to send out a signal. The signal receiving and analyzing unit 130 receives the remote signal from the remote controller 160, and analyzes the remote signal to obtain a boot command carried therein. The television device 110 then enters a startup mode from a standby mode according to the boot command. It should be noted that, the signal receiving and analyzing unit 130 and the display module 120 shown in FIG. 1 are depicted with respect to external characteristics, with a part of respective hardware included in the television device 110. For example, the signal receiving and analyzing unit 130 includes an infrared receiver located at an exterior or a surface of the television device 110 to receive infrared signals, and further includes a microprocessor located in the television device 110 to receive control commands carried in the infrared signals. Similarly, in addition to a display panel that is located or visible at an outer surface of the television device 110, the display module 120 further includes elements such as a driving circuit and a backlight module located in the television device 110. When the signal receiving and analyzing unit 130 obtains the boot command, a processor (not shown) in the television device 110 performs a boot process of the television device 110 to cause the television device 110 to enter a startup mode. The boot process includes a pre-boot process and a process for activating the display module 120 to display an image. The pre-boot process generally includes a system initialization process such as channel scanning. If the television device is a smart television, the pre-boot process includes activating an operating system of the smart television. In a preferred embodiment, the pre-boot further includes processes of demodulating, deinterlacing, scaling and decoding video/audio signals (e.g., television programs from an antenna or cable television, or multimedia contents from video/audio compact disks) to generate image data to be displayed. The process of activating the display module 120 to display images includes illuminating the backlight module and activating the driving circuit to display the image to be displayed on a panel according to the image data. In addition to performing the boot process, the processor also performs a shutdown process of the television device 110, including storing statuses of the television device 110 (e.g., information such the current channel, selected signal source and volume) to a non-volatile memory, so as to restore to these statuses before the shutdown process the next time a user resumes viewing.

The remote controller 160 of the present invention includes a sensing element, e.g., a gyroscope and/or a G-sensor. The gyroscope detects a tilted angle of the remote controller 160, and the G-sensor detects an acceleration of the remote controller 160 when the remote controller 160 is moved. In general, a user usually holds the remote controller 160 in order to turn on the power of the television device 110. The motion of holding the remote controller 160, whether the remote controller 160 is held at a tilted angle to aim at the television device 110 or is lifted from a table surface to elevate the altitude of the remote controller 160, is detected by the gyroscope or the G-sensor to accordingly determine whether to generate and send a signal that carries the pre-boot command. In another embodiment, the remote controller 160 may be a handheld electronic device capable of executing applications, e.g., a smart phone or a tablet computer. When an application with a remote control function on the remote controller 160 is activated (whether entering an activated state from a non-activated state or prompting the application to enter an executed state at the foreground from a suspended state at the background), there is a great chance that the user is getting ready to watch television. Therefore, for a remote controller capable of executing applications, the remote controller determines whether to generate and send a signal carrying the pre-boot command by detecting whether an application with a remote control function is activated.

Thus, the remote controller 160 generates the signal carrying the pre-boot command according to the detection result, and sends the signal to the signal receiving and analyzing unit 130. When the signal receiving and analyzing unit 130 analyzes the signal to generate the pre-boot command, the processor of the television device 100 performs the foregoing pre-boot process. It should be noted that, the power button on the remote controller 160 is not yet pressed at this point, i.e., the television device 110 is not yet officially activated. As the display module 120 is not yet activated, the user is unaware that video/audio signals are being processed in the television device 110. In the present invention, the behavior of the user before activating the television device 110 is detected to perform the pre-boot process in advance. When the pre-boot process is complete and the image to be displayed is ready, the display module 120 is allowed to immediately display the image upon pressing the power button on the remote controller 160, thereby rendering a shorter boot period and hence better user experiences. Further, because the display module is activated only after the image to be displayed is ready, the display module 120 of the television device 110 does not waste any power on displaying a black image, which is equivalently saving resources and enhancing resource utilization efficiency.

Figure 2:
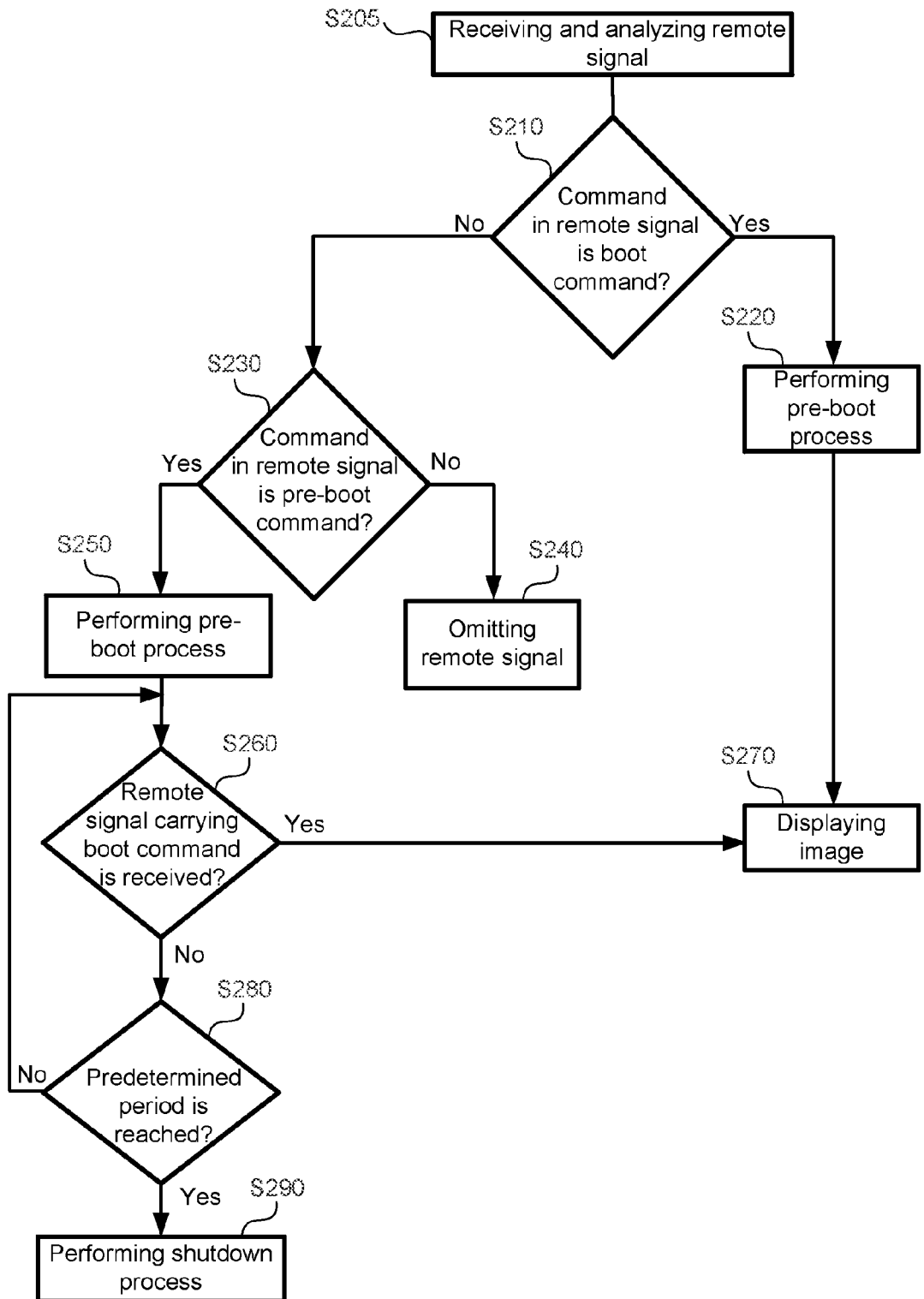
FIG. 2 is a flowchart of a method for controlling a television device to generate image data of the present invention.

FIG. 2 shows a flowchart of a method for controlling a television device to generate image data of the present invention. For example, the method may be performed by the signal receiving and analyzing unit 130 and the internal processor of the television device 110. A remote signal sent from the remote controller 160 is received and analyzed to obtain a command carried in the remote signal (step S205). The command may be a pre-boot command, a boot command, or another type of command such as a command for adjusting the volume. It is determined whether the command is a boot command (step S210). If so, the above pre-boot process is performed (step S220), and a corresponding image is displayed according to the image data generated by the pre-boot process (step S270). Comparing with the foregoing description, step S220 and step S270 may be regarded as a part of the boot process of the television device 110. Further, step S220 and step S270 may be simultaneously performed, and thus step S270 then displays a black image. When the command carried in the remote signal is not a boot command, it is determined whether the command is the pre-boot command (step S230). When the command carried in the remote signal is neither a boot command nor a pre-boot command, and is probably a result of erroneously touching a number key or a volume key, this remote signal or command is omitted as the television device 110 is not in an activated state (step S240). When the command is a pre-boot command, the pre-boot process is performed (step S250) to generate the image data to be displayed in advance.

The pre-boot process in step S250 is substantially identical to the pre-boot process in step S220. In general, the pre-boot process (step S220 and step S250) includes a system initialization process of a television device, e.g., channel scanning. If the television device is a smart television, the pre-boot process further includes activating an operating system of the smart television. In another preferred embodiment, apart from the above processes, the pre-boot process further includes processing video/audio signals of the television device and generating an image to be displayed. The process, from the standby mode in which the television device does not have any available image to be displayed to a point at which a first image to be displayed is generated, may be regarded as a part of the pre-boot process. That is to say, when the first image to be displayed is generated, the pre-boot process is complete. Upon completing the pre-boot process, the method proceeds to a next step to display the image (step S270) or to enter a waiting mode (step S260 and step S280). It should be noted that, in steps S270, S260 and S280, it does not mean that the television device no longer generates new images. In fact, in the steps of displaying the image and in the waiting mode, the images are continuously generated to update the image to be displayed at all times.

Referring to FIG. 2, after step S250, it is determined whether a signal carrying a boot command is received (step S260). That is, when the image to be displayed is ready, it is determined whether a power button is intentionally pressed. When the signal carrying the boot command is received and the boot command is generated from analyzing the signal, it is determined that the power button is intentionally pressed, the display module of the television device is activated, and the display module displays the image according to the image data (step S270). If not, it is determined whether a predetermined period is reached (step S280). Before the predetermined period is reached and before the boot command is received, step S260 and step S280 are iterated, and so the two steps may be together regarded as the waiting mode. In the waiting mode, the display module 120 of the television device 110 is not activated (because the boot command is in fact not yet received), and it is expected that the power button of the remote controller 160 is to be pressed within the predetermined period. There are two conditions that exit the waiting mode. In one of the conditions, the power button of the remote controller 160 is pressed to generate the boot command before the predetermined period is reached, and the display module 120 is activated to display the image (step S270). In the other condition, the predetermined period is reached and no boot command is generated, and the shutdown process of the television device is performed (step S290). The shutdown process in step S290, which may be the foregoing common shutdown process, records the statuses of the television device 110 before the television device 110 enters the standby mode. The previous utilization statuses of the television device 110 are restored in the pre-boot process (step S250), and is kept unchanged in the subsequent waiting mode (step S260 and step S280). Therefore, the shutdown process in step S290 may omit the step of recording the utilization statuses of the television device 110.

It should be noted that, when the television device 110 performs the pre-boot procedure of step S250 according to the pre-boot command, it is probable that the power button be pressed before the pre-boot process is complete. At this point, the boot command received is recorded, and step S270 is not yet performed. As such, after step S250 ends, it is immediately determined in step S260 that the boot command is received, and step S270 is directly performed without having the television device 110 enter the waiting mode.

Apart from passively receiving the pre-boot signal from the remote controller, the present invention may further initiatively generate the pre-boot signal. Again referring to FIG. 1, the television device 110 may further include a signal receiving and analyzing unit 140 that receives optical signals of ambient light of the television device 110. For example, an image in front of the television device 110 is captured by a photographing lens, and a remote signal received by the signal receiving and analyzing unit 140 is an optical signal. A microprocessor of the signal receiving and analyzing unit 140 identifies whether a user is present in a predetermined region (e.g., a soft in front of the television) or whether a user generates an identifiable gesture (e.g., lifting a hand) by image recognition. The signal receiving and analyzing unit 140 may then generate a boot command or a pre-boot command according to the above information. For example, the signal receiving and analyzing unit 140 initiatively detects that a user enters a photographing range and accordingly generates a boot command at this point, or initiatively detects that a user is lifting a hand and accordingly generates a boot command. The abovementioned signal receiving and analyzing unit 130 that receives the remote signal from the remote controller 160 may be referred to as a passive signal receiving and analyzing unit, and the signal receiving and analyzing unit 140 that generates the boot command or the pre-boot command through detecting the ambient environment may be referred to as an active signal receiving and analyzing unit. The active signal receiving and analyzing unit 140 may operate in coordination with the passive signal receiving and analyzing unit 130. For example, the signal receiving and analyzing unit 140 immediately generates a pre-boot command upon detecting a user, and the signal receiving and analyzing unit 130 in the waiting mode generates a boot command upon receiving the boot signal from the remote controller 160. Detecting whether a user is present in a predetermined region or whether a user generates a motion through identifying an image of visible light is given as an example of the implementation of the active signal receiving and analyzing unit 140 in one embodiment. In the active signal receiving and analyzing unit 140 according to another embodiment, an infrared signal of the temperature emitted from a body surface may be received by a thermal camera to detect whether a user is present or whether a user generates a motion.

Figure 3:
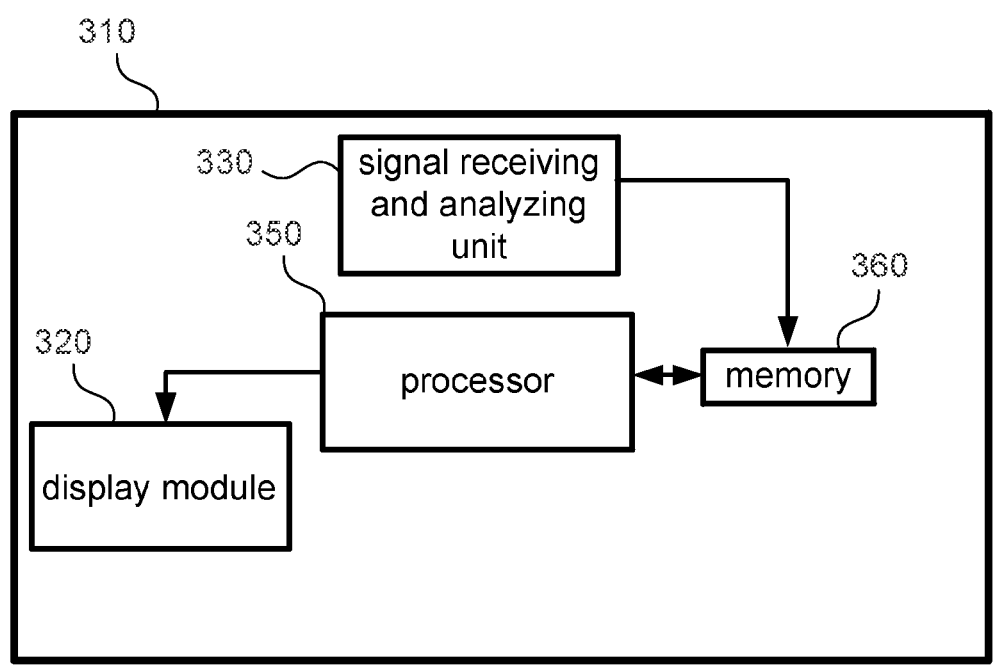
FIG. 3 is a block diagram of internal circuits of a television device according to an embodiment of the present invention.

FIG. 3 shows a block diagram of internal circuits of a television device according to an embodiment of the present invention. A television device 310 includes a display module 320, a signal receiving and analyzing unit 330, a processor 350 and a memory 360. As previously described, the signal receiving and analyzing unit 330 may be the passive signal receiving and analyzing unit 130 or the active signal receiving and analyzing unit 140. That is to say, the signal receiving and analyzing unit 330 may receive the remote signal sent from the remote controller 160 and obtain the pre-boot command or the boot command carried in the remote signal, or may initiatively generate the pre-boot command or the boot command through detecting the ambient environment. Further, the television device 310 may include more than one signal receiving and analyzing unit 330. In FIG. 3, only one signal receiving and analyzing unit 330 is taken as an example for illustrating connections and signal transmission with peripheral components. The signal receiving and analyzing unit 330, coupled to the memory 360, analyzes the remote signal, accordingly generates a command (e.g., a pre-boot command, a boot command or another type of command), and stores the command to the memory 360. The processor 350, coupled to the memory 360 and the display module 320, performs main functions that are previously described. In the embodiment, the processor 350 reads the command in the memory 360 at a fixed time interval by a polling approach. Therefore, when the television device 310 enters a waiting mode, given the signal receiving and analyzing unit 330 receives the boot command, the processor 350 may read the command from the memory 360 to control the display module 320 to display an image and to cause the television device 310 to exit the waiting mode. It should be noted that, it is possible that the power button be pressed before the television device 310 enters the waiting mode. At this point, step S250 in FIG. 2 is being performed, and the signal receiving and analyzing unit 330 similarly writes the boot command to the memory 360. When the processor 350 discovers that the boot command is stored in the memory 360 during a polling process, the processor 350 may indicate that the boot command is generated through setting a register value and then immediate activate the display module 320 according to the register value after step S250 is complete. As such, the television device 310 does not enter the waiting mode.

Figure 4:
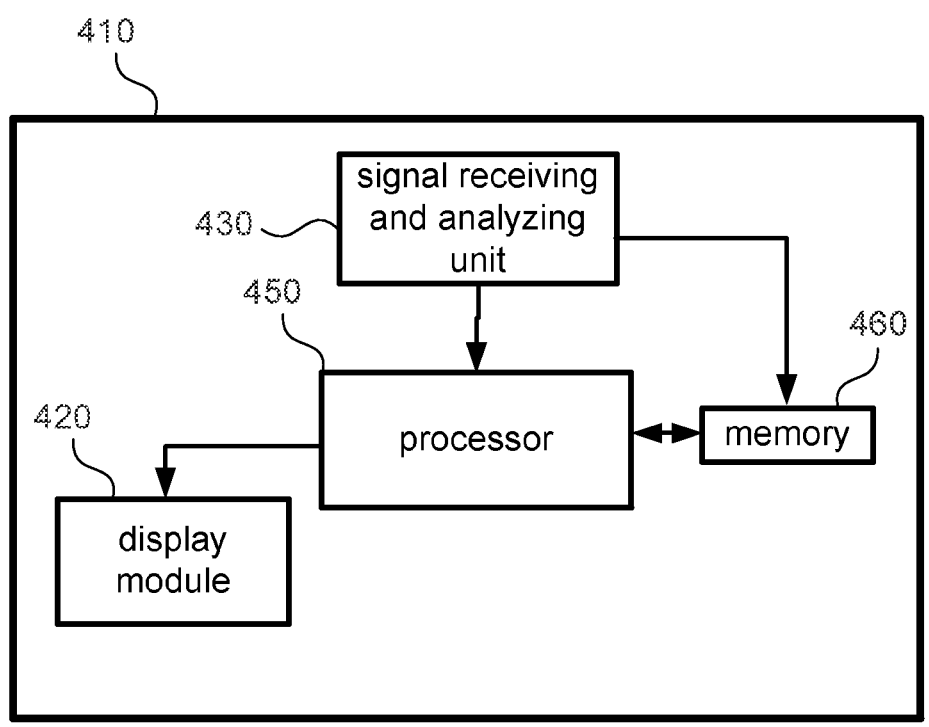
FIG. 4 is a block diagram of internal circuits of a television device according to another embodiment of the present invention.

FIG. 4 shows a block diagram of internal circuits of a television device according to another embodiment of the present invention. A television device 410 includes a display module 420, a signal receiving and analyzing unit 430, a processor 450 and a memory 460. As previously stated, the television device 410 may include more than one signal receiving and analyzing unit 430. In the embodiment, the signal receiving and analyzing unit 430, coupled to the memory 460 and the processor 450, analyzes a remote signal, accordingly generates a command (e.g., a pre-boot command, a boot command or another type of command), stores the command in the memory 460, and sends a notification to the processor 450. For example, the notification is an interrupt signal. The processor 450, coupled to the memory 460 and the display module 420, reads the command from the memory 460 according to the notification from the signal receiving and analyzing unit 430. When the television device 410 is in a waiting mode and the command is a boot command, the processor 450 controls the display module 420 to activate and to display an image, and causes the television device 410 to exit the waiting mode at the same time. While the processor 450 performs the pre-boot process of step S250, if the processor 450 receives the notification from the signal receiving and analyzing unit 430 that asks the processor 450 to read the command from the memory 460 and the command is the boot command, the processor 450 may indicate that the boot command is already generated by setting a register value. Thus, after step S250, it is determined that the boot command is generated (step S260) and step S270 is immediately performed, such that the television device 410 does not enter the waiting mode.

Figure 5:
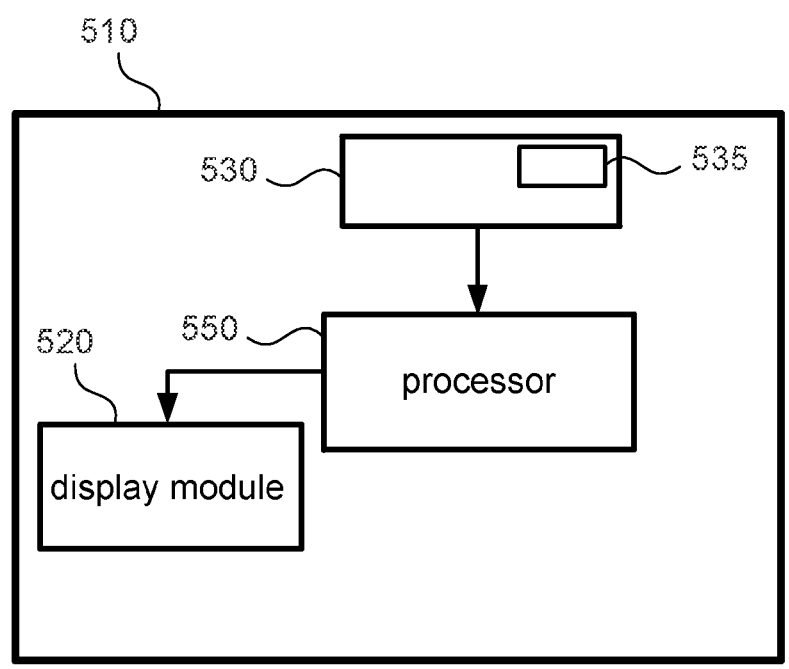
FIG. 5 is a block diagram of internal circuits of a television device according to another embodiment of the present invention.

FIG. 5 shows a block diagram of internal circuits of a television device according to another embodiment of the present invention. A television device 510 includes a display module 520, a signal receiving and analyzing unit 530 and a processor 550. In the embodiment, the signal receiving and analyzing unit 530 includes a memory 535. After analyzing a remote signal and accordingly generating a command (e.g., a pre-boot command, a boot command or another type of command), the signal receiving and analyzing unit 530 stores the command to the memory 535, and sends the command in the memory 535 to the processor 550 in a first-in-first-out (FIFO) approach. Details for handling the boot command of the processor 550 in different statuses (e.g., having entered the waiting mode or still performing step S250) are disclosed in the description of the foregoing embodiments, and shall be omitted herein.

In practice, the processor 350 (450, 550) may be a control chip of the television 310 (410, 510), and is capable of performing the pre-boot process and the activation and deactivation of the display module 320 (420, 520) by utilizing the same control unit or by utilizing different control units. Further, the signal receiving and analyzing unit 330 (430, 530), the memory 360 (460, 535) and the processor 350 (450, 550) jointly form a control module of the television device 310 (410, 510).

The method for controlling a television device to generate image data disclosed in the flowchart in FIG. 2 and the associated description may be performed by the device disclosed in FIG. 3 to FIG. 5. The method for activating a television device of the present invention, before the television device officially receives a boot command, is capable of performing a pre-boot process in advance, thereby shortening a period of showing a black image from receiving the boot command to displaying an image and enhancing user experiences. According to differences in the configuration and application of the memories in FIG. 3 and FIG. 4, in addition to the flowchart shown in FIG. 2, the method for controlling a television device to generate image data of the present invention, after analyzing the remote signal and accordingly generating the pre-boot command or the boot command, further includes one of three steps of: a) storing the boot command or the pre-boot command to the memory, and checking whether the memory stores the boot command or the pre-boot command at a predetermined fixed interval; b) storing the boot command or the pre-boot command to the memory and generating an interrupt signal, and reading the boot command or the pre-boot command from the memory according to the interrupt signal; and c) storing the boot command or the pre-boot command to the memory according to a generation sequence, and sending the command in the memory to the processor according to a FIFO approach. Details of the three steps above are disclosed in the description associated with the corresponding devices, and shall be omitted herein.

Figure 6:
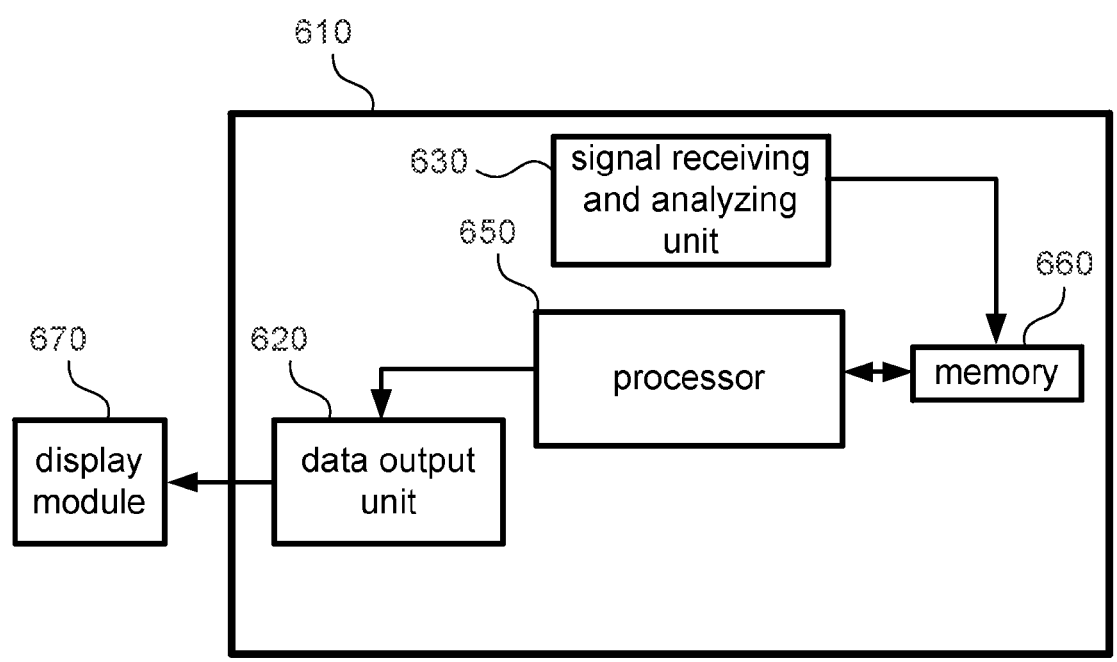
FIG. 6 is a diagram of connections of internal circuits of a set-up box (STB) and a display module according to an embodiment of the present invention.

In addition to being applied to the foregoing television device, the present invention may also be applied to other multimedia devices, such as a set-up box (STB). FIG. 6 shows a diagram of connections of internal circuits of an STB and a display module according to an embodiment of the present invention. An STB 610 includes a data output unit 620, a signal receiving and analyzing unit 630, a processor 650 and a memory 660. The signal receiving and analyzing unit 630, the memory 660 and the processor 650 have identical or similar functions as the corresponding elements in the embodiment in FIG. 3, and the method that the processor 650 uses to obtain the control command is the same as that in the embodiment in FIG. 3. These details shall be omitted herein. The data output unit 620 is coupled to the processor 650 and a display module 670 located outside the STB 610. The processor 650 may control the data output unit 620 to convert image data generated by the processor 650 to a format compliant to a transmission interface standard and to output the converted data. For example, assuming that the STB 610 supports High-Definition Multimedia Interface (HDMI) output, the data output unit 620 converts the image data to an HDMI-compliant format, and outputs the converted image data to the display module 670. For example, the display module 670 may be a display module of a television device or a monitor. Before the processor 650 receives the boot command, even if the pre-boot process is complete and the image data is generated, the processor 650 does not control the data output unit 620 to output data. That is to say, in the waiting module, the image data of the STB 610 is not outputted to the display module 670, which is then unable to display an image according to the image data. When the processor 650 receives the boot command, the processor 650 exits the waiting mode if the processor 650 at that time is in the waiting mode, and controls the data output unit 620 to start outputting the image data; or else if the processor 650 is still performing the pre-boot process, the processor 650 immediately controls the data output unit 620 to start outputting the image data right after the pre-boot process is complete without entering the waiting mode. In the embodiment, the data output unit 620, the signal receiving and analyzing unit 630, the processor 650 and the memory 660 form a control module of the STB 610 to control the STB 610 to generate the image data required by the display module 670.

Figure 7:
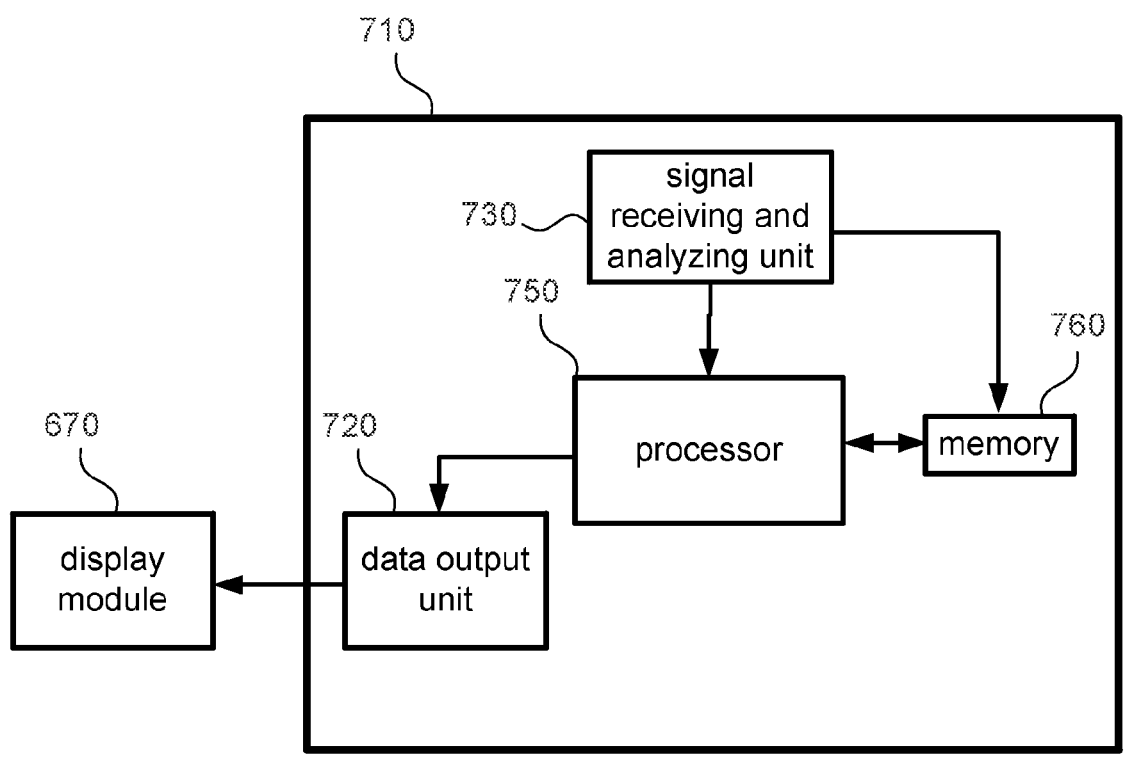
FIG. 7 is a diagram of connections of internal circuits of an STB and a display module according to another embodiment of the present invention.

FIG. 7 shows a diagram of connections of internal circuits of an STB and a display module according to another embodiment of the present invention. An STB 710 includes a data output unit 720, a signal receiving and analyzing unit 730, a processor 750 and a memory 760. The signal receiving and analyzing unit 730, the memory 760 and the processor 750 have identical or similar functions as the corresponding elements in the embodiment in FIG. 4, and the method that the processor 750 obtains the control command is similar to that in the embodiment in FIG. 4. These details shall be omitted herein. The data output unit 720 has an identical function as that of the data output unit 620 in the embodiment in FIG. 4, and associated details shall be omitted herein. In the embodiment, the data output unit 720, the signal receiving and analyzing unit 730, the processor 750 and the memory 760 form a control module of the STB 710 to control the STB 710 to generate the image data required by the display module 670.

Figure 8:
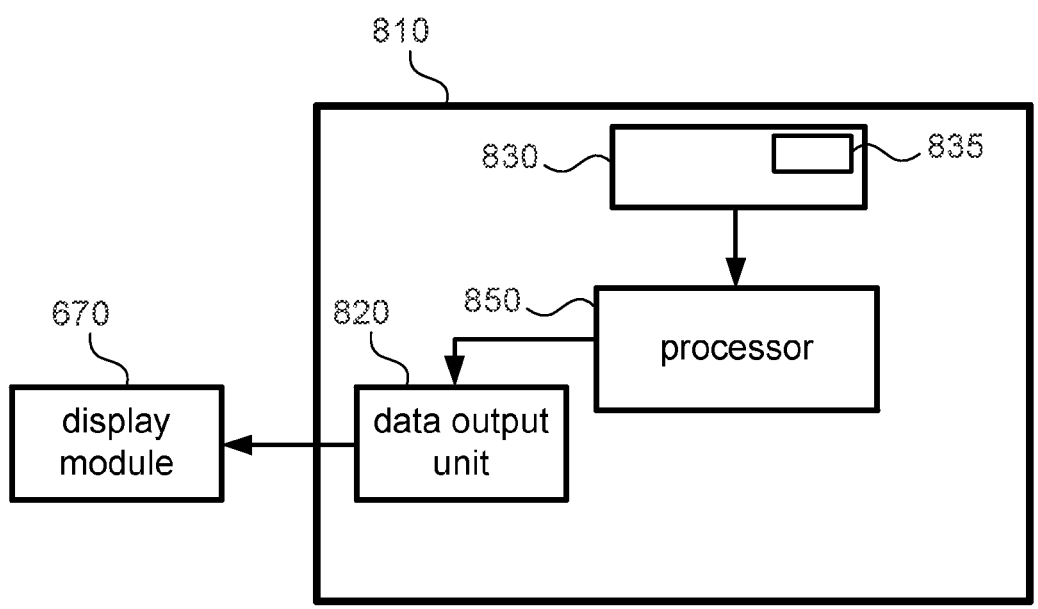
FIG. 8 is a diagram of connections of internal circuits of an STB and a display module according to another embodiment of the present invention.

FIG. 8 shows a diagram of connections of internal circuits of an STB and a display module according to another embodiment of the present invention. An STB 810 includes a data output unit 820, a signal receiving and analyzing unit 830, a processor 850 and a memory 835. The signal receiving and analyzing unit 830, the memory 835 and the processor 850 have identical or similar functions as the corresponding elements in the embodiment in FIG. 5, and the method that the processor 850 obtains the control command is similar to that in the embodiment in FIG. 5. These details shall be omitted herein. The data output unit 820 has an identical function as that of the data output unit 620 in the embodiment in FIG. 6, and associated details shall be omitted herein. In the embodiment, the data output unit 820, the signal receiving and analyzing unit 830, the processor 850 and the memory 835 form a control module of the STB 810 to control the STB 810 to generate the image data required by the display module 670.

It should be noted that, the control module of the STB 610 (710, 810) may include more than one signal receiving and analyzing unit 630 (730, 830), e.g., simultaneously including one passive signal receiving and analyzing unit and one active signal receiving and analyzing unit, so as to increase application flexibilities of the present invention.

Figure 9:
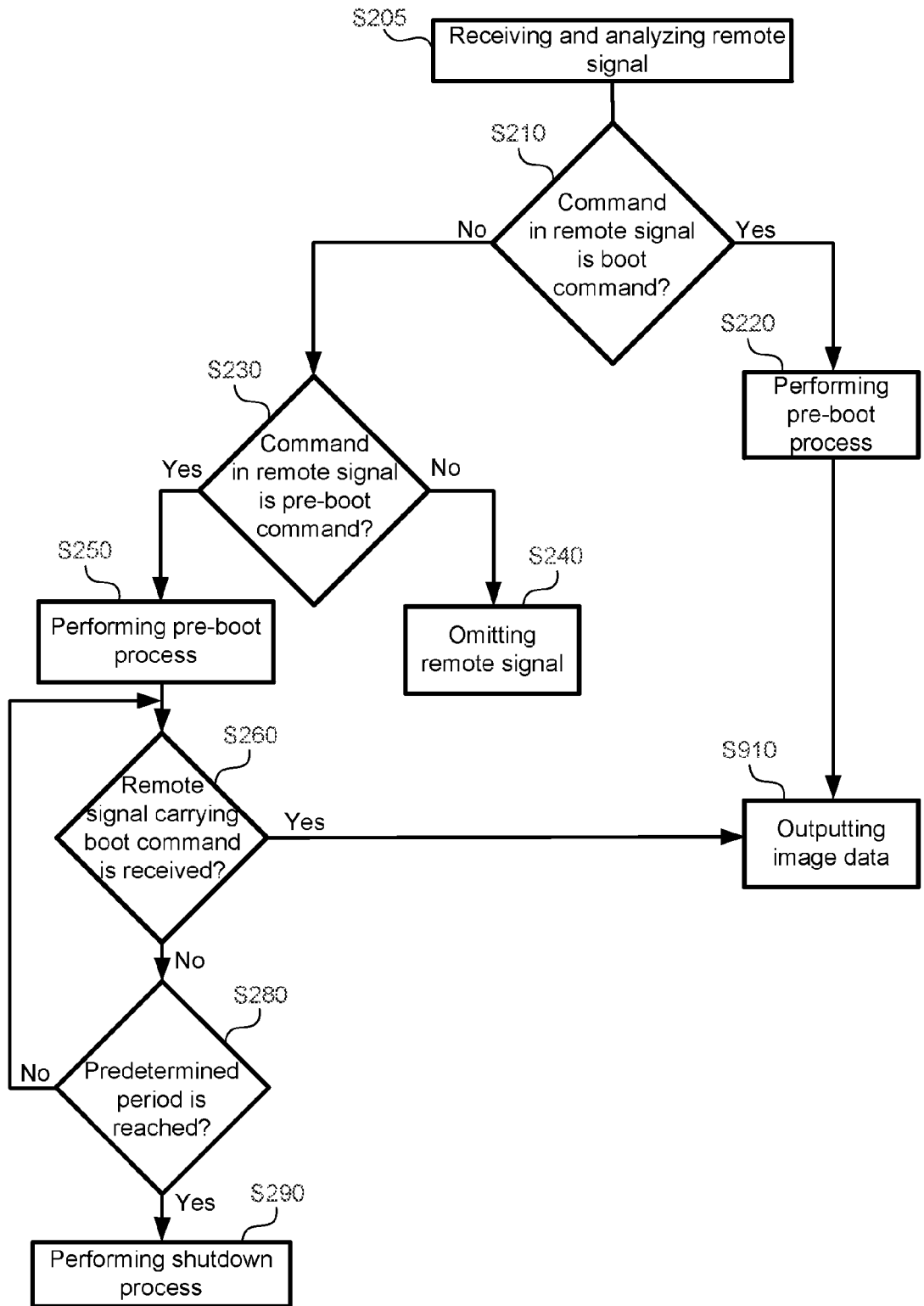
FIG. 9 is a flowchart of a method for controlling an STB to generate image data according to an embodiment of the present invention.

FIG. 9 shows a flowchart of a method for controlling an STB to generate image data of the present invention. Steps with the same denotations in FIG. 9 and FIG. 2 have identical contents, and such details shall be omitted herein. It should be noted that, in the process in FIG. 9, after step S220 completes the pre-boot process or the boot command is received in the waiting mode (steps S260 and S280), step S910 is performed to output the generated image data. That is to say, in the waiting mode, the image data of the STB is not outputted, and the image data is not utilized by any display module to display a corresponding image.

One person skilled in the art can understand details and possible implementation variations of the method in FIG. 2 according to the disclosure of the devices in FIG. 3 to FIG. 5, and details and possible implementation variations of the method in FIG. 9 according to the disclosure of the devices in FIG. 6 to FIG. 8. Without affecting the full disclosure and possible implementation, such repeated description is omitted herein. In possible implementation, one skilled person in the art would selectively implement part or all technical features of any embodiment of the application or selectively combine part or all technical features of the embodiments of the application based on the disclosure of the present invention to enhance the implementation flexibility of the present invention. Further, although a television device and an STB are taken as examples in the foregoing embodiments, based on the disclosure of the present invention, one person skilled in the art may appropriately apply the present invention to other types of playback devices that generate image data.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A control module of a television, configured to generate image data required by a display module, comprising:
   a signal receiving and analyzing unit, configured to receive a first signal to accordingly generate a pre-boot command at a first time point, and to receive a second signal to accordingly generate a boot command at a second time point; and
   a processor, configured to perform a pre-boot process including television signal processing according to the pre-boot command to generate the image data, and to enter a waiting mode when the pre-boot process is complete, and to exit the waiting mode according to the boot command;
   wherein, in the waiting mode the display module is not activated such that the image data is not used to display an image by the display module when the processor remains in the waiting mode, and
   wherein the television comprises the display module, and during the pre-boot process, according to the pre-boot command, the processor sets a register value according to the boot command generated by the signal receiving and analyzing unit, after the pre-boot process is complete, the processor controls the display module to display the image according to the register value and the image data.

2. The control module according to claim 1, wherein the processor further performs a shutdown process when the processor remains in the waiting mode and does not receive the boot command within a predetermined period.

3. The control module according to claim 1, further comprising:
   a data output unit, coupled to the processor, configured to output the image data;
   wherein, when the processor performs the pre-boot process according to the pre-boot command and the signal receiving and analyzing unit generates the boot command before the pre-boot process is complete, the processor controls the data output unit to output the image data for use of the display module when the pre-boot process is complete.

4. The control module according to claim 1, further comprising:
   a memory, coupled to the signal receiving and analyzing unit and the processor, configured to store the boot command and the pre-boot command;
   wherein, the processor checks contents of the memory at a predetermined time interval.

5. The control module according to claim 1, further comprising:
   a memory, coupled to the signal receiving and analyzing unit and the processor, configured to store the boot command and the pre-boot command;
   wherein, when the signal receiving and analyzing unit generates one of the boot command and the pre-boot command, the signal receiving and analyzing unit stores the generated boot command or the generated pre-boot command to the memory and notifies the processor to read the generated boot command or the generated pre-boot command from the memory.

6. The control module according to claim 1, wherein the first signal is generated through one of detecting whether a user is present and detecting a motion of the user.

7. The control module according to claim 6, wherein the first signal is generated through one of detecting whether the user is present within a predetermined region and detecting the motion of the user in the predetermined region.

8. The control module according to claim 1, wherein the first signal is sent from a remote controller; the remote controller comprises one of a gyroscope and a G-sensor, and the first signal is generated according to a sensing signal of the gyroscope or the G-sensor.

9. The control module according to claim 1, wherein the first signal is sent from a handheld electronic device with an application capability, and the first signal is generated according to whether an application with a remote function is activated.

10. A method for controlling a television to generate image data required by a display module, comprising:
    receiving a first signal and accordingly generating a pre-boot command at a first time point;
    performing a pre-boot process including television signal processing according to the pre-boot command, and controlling the television to enter a waiting mode when the pre-boot process is complete;
    receiving a second signal and accordingly generating a boot command at a second time point when the television remains in the waiting mode; and
    controlling the television to exit the waiting mode according to the boot command;
    wherein, in the waiting mode the display module is not activated such that the image data is not used to display an image by the display module when the television remains in the waiting mode, and
    wherein the television comprises the display module, and the method further comprises:
    during the pre-boot process, according to the pre-boot command, setting a register value according to the boot command, and after the pre-boot process is complete, controlling the display module to display the image according to the register value and the image data.

11. The method according to claim 10, further comprising:
performing a shutdown process of the television when the television remains in the waiting mode and the second signal is not received within a predetermined period.

12. The method according to claim 10, further comprising:
when the second signal is received and the boot command is accordingly generated before the step of performing the pre-boot process according to the pre-boot command is completed, outputting the image data for use of the display module after the step of performing the pre-boot process according to the pre-boot command is complete.

13. The method according to claim 10, further comprising:
when one of the boot command and the pre-boot command is generated, storing the generated boot command or the generated pre-boot command to a memory and generating a notification signal; and
reading the stored boot command or the stored pre-boot command from the memory according to the notification signal.

14. The method according to claim 10, wherein the first signal is generated through one of detecting whether a user is present and detecting a motion of the user.

15. The method according to claim 14, wherein the first signal is generated through one of detecting whether the user is present within a predetermined region and detecting the motion of the user in the predetermined region.

16. The method according to claim 10, wherein the first signal is sent from a remote controller; the remote controller comprises one of a gyroscope and a G-sensor, and the first signal is generated according to a sensing signal of the gyroscope or the G-sensor.

17. The method according to claim 10, wherein the first signal is sent from a handheld electronic device with an application capability, and the first signal is generated according to whether an application with a remote function is activated.

18. The method according to claim 10, wherein the pre-boot process comprises generating the image data, and the generating of the data image data indicates that the pre-boot process is complete.

19. A control module of a television, configured to generate image data required by a display module, comprising:
a signal receiving and analyzing unit, configured to receive a first signal to accordingly generate a pre-boot command at a first time point, and to receive a second signal to accordingly generate a boot command at a second time point; and
a processor, configured to perform a pre-boot process to activate an operating system of the television according to the pre-boot command to generate the image data, and to enter a waiting mode when the pre-boot process is complete, and to exit the waiting mode according to the boot command;
wherein, in the waiting mode the display module is not activated such that the image data is not used to display an image by the display module when the processor remains in the waiting mode, and wherein the television comprises the display module, and during the pre-boot process, according to the pre-boot command, the processor sets a register value according to the boot command generated by the signal receiving and analyzing unit, after the pre-boot process is complete, the processor controls the display module to display the image according to the register value and the image data.

* * * * *